United States Patent
Kritt et al.

(10) Patent No.: US 9,298,944 B2
(45) Date of Patent: Mar. 29, 2016

(54) CONFIDENTIAL INFORMATION DELIVERY IN A MULTI-DEVICE ENVIRONMENT

(71) Applicant: LENOVO ENTERPRISE SOLUTIONS (SINGAPORE) PTE. LTD., New Tech Park (SG)

(72) Inventors: Barry A. Kritt, Raleigh, NC (US); Sarbajit K. Rakshit, Kolkata (IN)

(73) Assignee: Lenovo Enterprise Solutions (Singapore) PTE. LTD., New Tech Park (SG)

(*) Notice: Subject to any disclaimer, the term of this patent is extended or adjusted under 35 U.S.C. 154(b) by 139 days.

(21) Appl. No.: 14/153,639

(22) Filed: Jan. 13, 2014

(65) Prior Publication Data
US 2015/0199538 A1      Jul. 16, 2015

(51) Int. Cl.
G06F 7/04      (2006.01)
G06F 21/62      (2013.01)

(52) U.S. Cl.
CPC .................... G06F 21/6245 (2013.01)

(58) Field of Classification Search
CPC ........... G06F 2221/2101; G06F 21/6227; G06F 21/6245; G06F 21/6254; G06F 21/6218; G06F 2221/2149; G06F 3/1454; G06F 9/526; G06F 17/30787; G06F 17/30796; G06F 21/10; G06F 21/60; G06F 21/608; G06F 17/5068; G06F 21/602; G06F 21/86; G06F 2217/04; B42D 15/025; G06Q 20/3825; Y10S 283/901; Y10T 29/49826; Y10T 428/1495; Y10T 428/15
USPC .......................................................... 726/26
See application file for complete search history.

(56) References Cited

U.S. PATENT DOCUMENTS

| | | |
|---|---|---|
| 8,179,556 B2 | 5/2012 | Salgado et al. |
| 2009/0019553 A1* | 1/2009 | Narayanaswami .............. 726/28 |
| 2009/0116643 A1 | 5/2009 | Hatano et al. |
| 2010/0302586 A1* | 12/2010 | Takahashi et al. ........... 358/1.15 |
| 2012/0036452 A1 | 2/2012 | Coleman et al. |

OTHER PUBLICATIONS

Y. Ikawa et al., "A New Document Masking Approach for Removing Confidential Information", E-Commerce and the 4th IEEE International Conference on Enterprise Computing, Jul. 2007, Abstract, 2 pages.
M. Cooney, "IBM researchers build security software to mask confidential info", Layer 8, Network World, Jul. 8, 2009, 4 pages.
Certificall, "Confidential Data Delivery", <http://www/certificall.net/usages/confidential-delivery.html>, at least as early as Aug. 2013, 1 page.
ISACA, "Mobile Devices May Pose Greatest Threat to Confidential Information: New ISACA White Paper", Press Release, Aug. 3, 2010, 2 pages.

* cited by examiner

*Primary Examiner* — Kambiz Zand
*Assistant Examiner* — Abiy Getachew
(74) *Attorney, Agent, or Firm* — Katherine Brown (57) ABSTRACT

An automated technique for delivering confidential information in a multi-device environment may include receiving confidential information at a first computing device associated with a first user from a second computing device associated with a second user, masking the confidential information on the first computing device while displaying non-confidential information received from the second computing device (if any), and forwarding the confidential information for display on a third computing device that is capable of displaying the confidential information more securely than the first computing device, the third computing device being associated with the first user or a third party authorized to view the confidential information.

20 Claims, 4 Drawing Sheets

CONFIDENTIAL INFORMATION DELIVERY IN A MULTI-DEVICE ENVIRONMENT

BACKGROUND

1. Field

The present invention relates to the sharing of confidential data between computers and other intelligent devices. More particularly, the invention is directed to protecting the confidentiality of such data when it is viewed on a device.

2. Description of the Prior Art

By way of background, in any open place, while working on a laptop computer or other intelligent device, a user may have problems viewing confidential data received from another device without nearby persons also being able to glimpse the data. Examples of such confidential data include a bank account number, a credit card number, salary information, etc. The confidential data may be present in an email body, chat content, any opened document, etc, that is received at the user's device. Showing the confidential information can be a security risk. The present disclosure is directed to a confidential information handling technique that addresses this issue.

SUMMARY

A system, a machine-implemented method and a computer program product are provided to implement an automated technique for delivering confidential information in a multi-device environment. In an example embodiment, the technique includes receiving confidential information at a first computing device associated with a first user from a second computing device associated with a second user, masking the confidential information on the first computing device while displaying non-confidential information received from the second computing device (if any), and forwarding the confidential information for display on a third computing device that is capable of displaying the confidential information more securely than the first computing device, the third computing device being associated with the first user or a third party authorized to view the confidential information.

In an example embodiment, the masking includes displaying a mask on the first computing device in lieu of the confidential information, the mask being displayed at a location where the confidential information would normally appear.

In an example embodiment, the mask is displayed in a manner that allows the confidential information to be correlated with the mask.

In an example embodiment, the mask is color coded with a color that matches a color associated with said display of said confidential information.

In an example embodiment, the confidential information is received at the first computing device in combination with the non-confidential information, and the technique further includes a confidential information identification operation to distinguish the confidential information from the non-confidential information.

In an example embodiment, the confidential information identification operation supports one or both of manual identification or automated identification of the confidential information.

In an example embodiment, the confidential information identification operation is performed at one or both of the first computing device or the second computing device.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
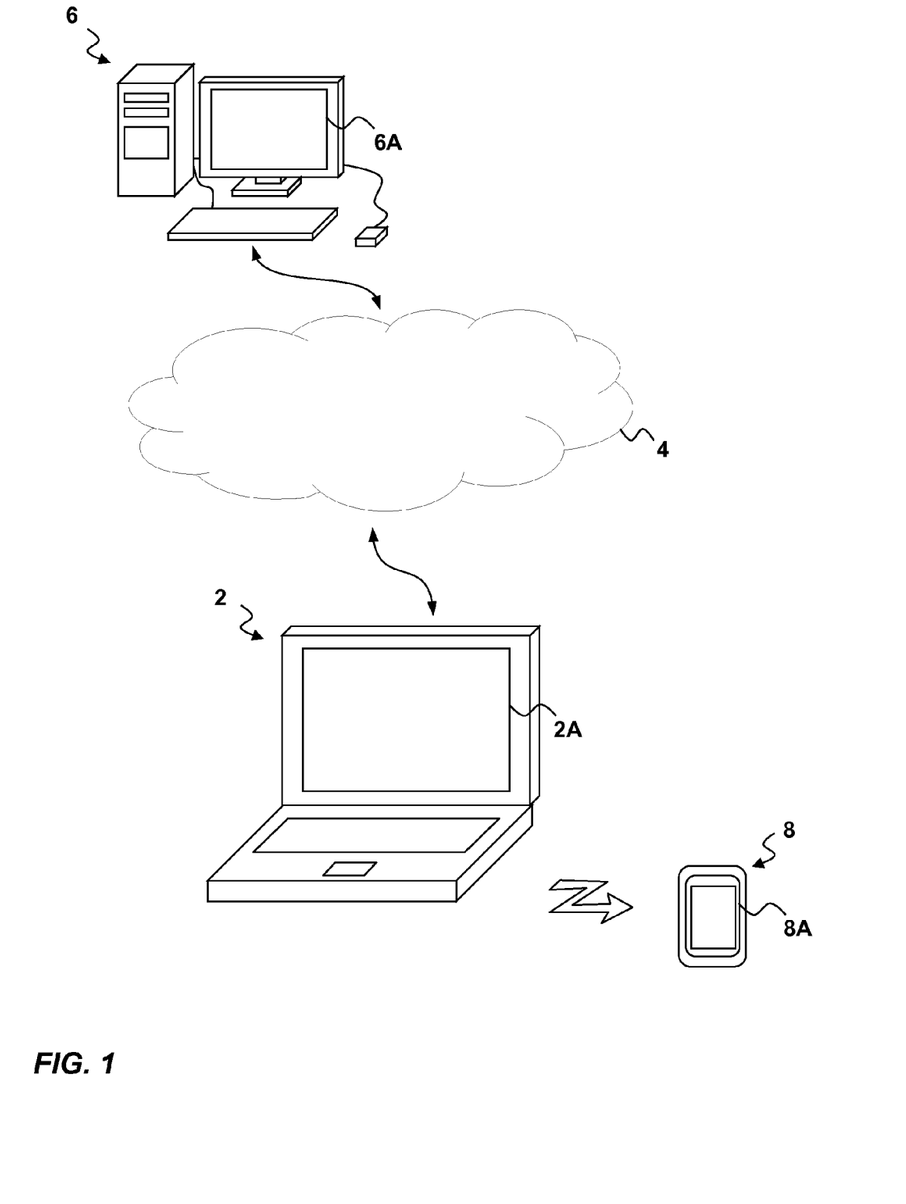
FIG. 1 is a functional block diagram showing an example multi-device computing environment that includes first, second and third computing devices.

Turning now to the drawing figures, wherein like reference numbers indicate like elements in all of the several views, FIG. 1 illustrates a first example computing device, shown by reference number 2, that receives information, including confidential information, via a network 4 (or other communication pathway) from a second example computing device, shown by reference number 6. The first computing device 2 (serving as the information receiver) is operated by a first user (not shown). The second computing device 6 (serving as the information sender) is operated by a second user (also not shown). The first computing device 2 additionally communicates with a third example computing device, shown by reference number 8, that is in close proximity to the first computing device. As described in more detail below, the third computing device 8 serves as an adjunct information receiver to handle the confidential portion of the information sent by the second computing device 6 to the first computing device 2. The third computing device 8 will typically be operated by the first user, but this need not always be the case.

For purposes of the present discussion, the first computing device 2 is assumed to have a display 2A that is relatively large in size, such that the information shown thereon is potentially readable by nearby persons without permission from the first user. This poses a security risk if the first user is operating the first computing device 2 in a public place. On the other hand, the third computing device 8 is assumed to have a display 8A that is relatively small in size, such that it can be viewed more confidentially by the first user (or a different authorized user), even in a public place. The second computing device 6 may also have a display 6A, but its size is not relevant to the present discussion. Indeed, the system 6 might not have any display at all (see below).

In the example embodiment of FIG. 1, the first computing device 2 is depicted as a species of portable computer commonly referred to a laptop computer. However, it could also be a tablet or any other type of portable computing apparatus having a relatively large display. Non-portable computers, such as desktop systems or workstations, could also be used to implement the first computing device 2. Such non-portable devices are pervasively used in public or quasi-public places such as business offices, libraries, government facilities, and other locations where the displayed information is potentially viewable by multiple persons. Additional examples of apparatus that could be used to implement the first computing device 2 are gaming consoles and television set-top devices (such as digital television receivers and digital video recording devices) that display information on a television monitor.

In the example embodiment of FIG. 1, the third computing device 3 is depicted as wireless hand-held device, such as a cellular telephone, a personal digital assistant, or a portable entertainment system, but it could also be some other type of portable computing device (wireless or wireline) having a relatively small display, such as a small tablet.

In the example embodiment of FIG. 1, the second computing device 6 is depicted as a species of computer commonly referred to a personal desktop computer. However, it could also be any other type of computing system, portable or non-portable. As previously noted, the second computing device 6 could operate without the display 6A, such as when the system 6 is implemented as a server system (such as a web server, for example). Non-limiting examples of the second computing device 6 include any of the device types mentioned in connection with the first computing device 2, as well as single-node or multi-node server-type systems implemented using real or virtualized computing resources.

In accordance with the confidential information delivery technique described herein, when the first computing device 2 receives information (including confidential information) from the second computing device 6, the confidential portion of the information is not displayed via the display 2A. The first computing device 2 only displays the non-confidential portion of the information that it receives from the second computing device 6. The confidential portion of the information is sent by the second computing device 2 to the third computing device 8, and this device outputs the confidential information on its display 8A. Due to the relatively small size of the display 8A, as well as the hand-held nature of the third computing device 8, the first user (or a different authorized user) can view the confidential information more securely than if that information was output (together with the non-confidential information) to the relatively large display 2A of the first computing device 2.

As used herein, the terms "relatively large" and "relatively small" when referring to the displays 2A and 8A pertain to the relative size difference between these two displays. In other words, the display 2A is relatively large compared to the display 8A, and the display 8A is relatively small compared to the display 2A. These terms are not meant to signify absolute sizes. However, it is generally the case that the display 8A will be small enough so as to be securely viewable without much effort to block third party viewing. For example, if the computing device 8 is implemented as a cellular telephone, the display 8A can be easily shielded from view by the second user's hand, or by virtue of being held close to the second user's body, or under an article of clothing, or by being positioned so as to be blocked by some other object (e.g., under a table). A cellular telephone with a screen size of around 3.5-5.5 inches (diagonal dimension) would thus be one example of the relatively small display 8A. A small tablet computer with a screen size of about 5.5-10.5 inches (diagonal dimension) would be another example even though it would be more difficult to shield than a cellular telephone. As noted above, handheld devices are the most secure because they are easy to maneuver so as to hide whatever confidential information is being displayed. The relatively large display 2A would typically have a screen size (diagonal dimension) in excess of 10.5 inches, and the computing device 2 would typically not be handheld.

Figure 2:
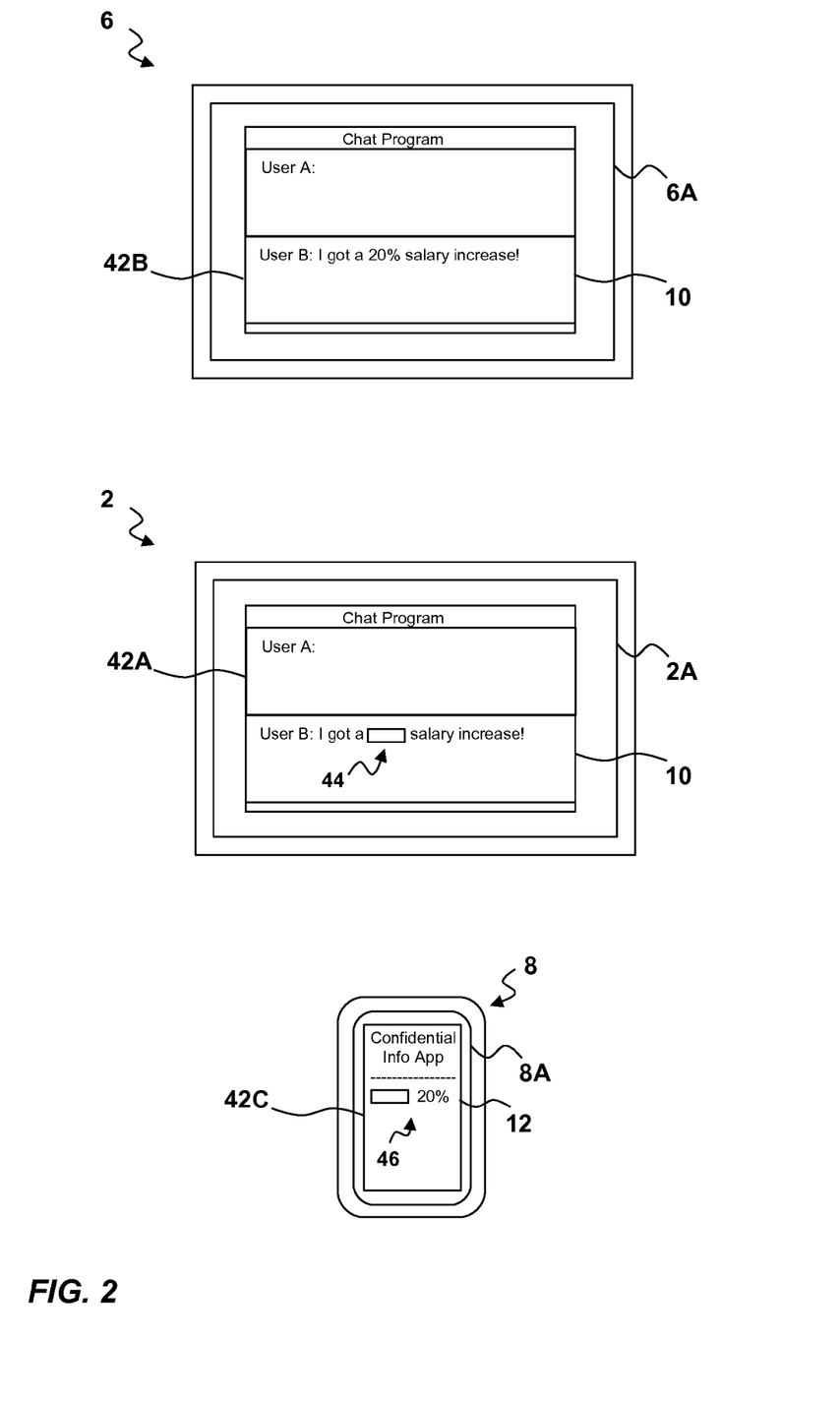
FIG. 2 is a functional block diagram showing the communication and display of information on the first, second and third computing devices if FIG. 1.

FIG. 2 illustrates one possible example of the disclosed technique in which the first computing device 2 and the third computing device 6 each run respective instances of a chat program 10. In FIG. 2, "User A" represents the first user operating the computing device 2 and "User B" represents the second user operating the computing device 6. Using the chat instance 10 associated with the second computing device 6, the second user generates a message that reads "I got a 20% salary increase!", and causes the message to be sent to the first computing device 2 via the network 4. In this message, the amount of the salary increase (i.e., "20%") represents confidential information. Using suitable program logic associated with the first and second computing devices 2 and 6 (described in more detail below), the "20%" value is identified as constituting confidential information. When the chat program instance 10 on the first computing device 2 processes the message, it displays the non-confidential portions of the message on the display 2A, but masks the confidential information by displaying a suitable mask (a white color bar in this example) in lieu of the confidential information. The mask is display at a location in the display 2A wherein the confidential information would normally appear. This is the location where the confidential information would be presented if it was not masked. Instead of displaying the confidential information on the display 2A, the computing device 2 sends it to the third computing device 8 to be displayed on the display 8A as the alphanumeric characters "20%". The third computing device 8 runs a confidential information application 12 with suitable program logic (described in more detail below) that performs the required operations.

Although not shown, another example of confidential information delivery would be where the second user sends a document containing confidential information from the second computing device 6. The confidential information might, for example, comprise a bank code, a bank account number, a PIN number, etc. In this example, the document would be displayed on the first computing device 2 with the confidential information being appropriately masked, and the confidential information would only be displayed on the third computing device 8. A further example of confidential information delivery would be where the second computing device 6 is an online transaction processing web server owned by a bank, brokerage firm or other financial institution, or an online retailer, etc., that serves up web pages containing confidential information. As in the previous examples, the confidential information would be appropriately masked on the first computing device 2, and would only be displayed on the third computing device 8.

As noted above, the first user will not necessarily be the person that views the confidential information displayed by the third computing device 8. This person could be a third user who is authorized to view the confidential information. In this scenario, the first user may not be authorized to view such information. For example, the first user could be operating the first computing device 2 to receive and forward confidential information on behalf of the third user operating the third computing device 8, and the first user might only have permission to view non-confidential information. An example scenario would be a corporate manager operating the first computing device 2 to show an employee operating the third computing device 8 certain information relating to the employee. The employee's non-confidential employment information could be presented on the display 2A of the first computing device 2 for viewing by both the manager and the employee. However, the employee's confidential information would be masked on the display 2A and viewable only by the employee on the display 8A of the third computing device 8. The second user operating the second computing device 6 to send the employment information in this scenario might be the corporate human resources manager.

Figure 3:
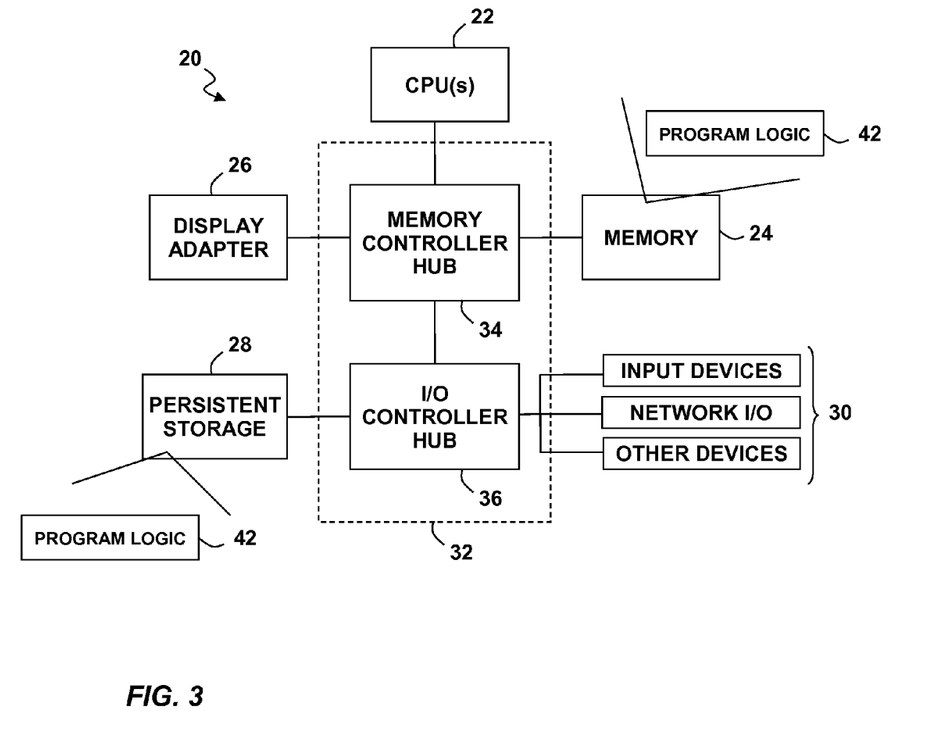
FIG. 3 is a functional block diagram showing example components of the first, second and third computing devices of FIG. 1.

FIG. 3 illustrates example hardware components 20 that may be used to implement each of the computing devices 2, 6 and 8. The hardware components 20 may include one or more CPUs or other logic-implementing hardware 22 that may operate in conjunction with a memory 24 (e.g., RAM, ROM, or a combination thereof) to provide a data processing core. Additional components may include a display adapter 26 for generating visual output information to the associated display 2A, 6A or 8A (e.g., text and/or graphics), a persistent storage resource 28 (e.g., a disk drive, a solid state drive, flash storage, etc.), and various peripheral devices 30. The peripheral devices 30 may include an input device such as a mouse, touch pad or other pointing device, a keyboard (real or virtual), and/or a touch screen, depending on the nature of the computing device being implemented. The peripheral devices 30 may also include other I/O resources, such as network I/O devices (Ethernet, WiFi, Cellular, etc.), and various other types of devices. A bus infrastructure 32, which may include a memory controller hub or chip 34 (e.g., a northbridge) and an I/O (input/output) controller hub or chip 36 (e.g., a southbridge), may be used to interconnect the foregoing components. It should be understood that the hardware components 20 are exemplary in nature, and that other component arrangements may also be used to implement the computing devices 2, 6 and 8.

Figure 4:
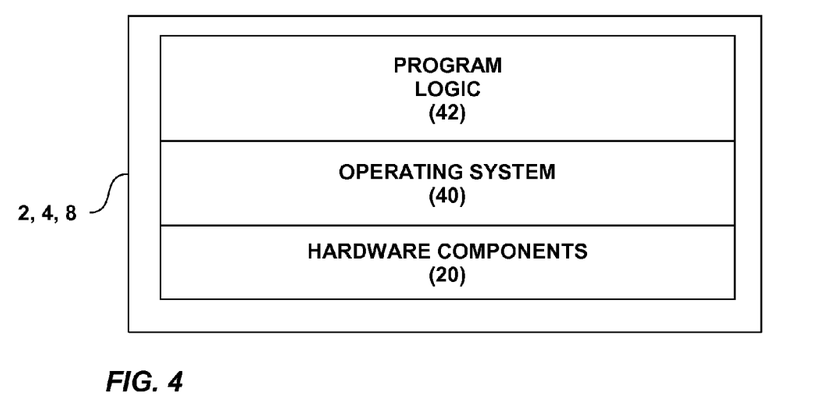
FIG. 4 is a functional block diagram additionally showing example program logic that may be variously implemented on the first, second and third computing devices of FIG. 1.

Turning now to FIG. 4, the example hardware components 20 of the computing devices 2, 6 and 8 are shown in combination with higher level operational resources, namely, an operating system 40 and application program logic 42. The operating system 40 may be provided by any conventional operating system program capable of controlling the underlying hardware components 20, including but not limited to general purpose operating systems, embedded operating systems, guest operating systems running in a virtual machine, virtual machine managers, hypervisors, etc. The application program logic 42 runs in conjunction with the operating system 40 to control the hardware components 20 to perform the confidential information delivery functions described herein.

As shown in FIG. 2, the program logic 42 respectively runs in separate instances 42A, 42B and 42C on the computing devices 2, 6 and 8, with each program logic instance performing different operations on each device. In an example embodiment, the program logic instances 42A and 42B on the first and second computing devices 2 and 6 are incorporated into a larger program, such as the chat program 10, an email client program, a word processing program, etc. Another example would be a web server running on the second computing device 6 (comprising program logic instance 42B) and a web browser running on the first computing device 2 (providing program logic instance 42A). In an example embodiment, the program logic instance 42C on the third computing device 8 is a dedicated program designed specifically to support confidential information delivery as disclosed herein, such as the confidential application 12. Alternatively, the program logic instance 42C could part of a larger program that provides other functionality, such as an email client, a text messaging program, a web browser, etc.

As mentioned, the operations performed by the program logic instances 42A, 42B and 42C differ on each of the computing devices 2, 6 and 8. A first operation that can be performed by either the first program logic instance 42A on the first computing device 2, or the second program logic instance 42B on the second computing device 6, is to identify the confidential information so that it can be handled separately from any associated non-confidential information. The confidential information identification operation can be performed in various ways. In one embodiment, a manual technique may be used that allows the second user operating the second computing device 6 to select any information that the user deems to be confidential (such as by highlighting portions of text). The second program logic instance 42B would then flag the designated confidential information in a suitable manner, such as by associating it with an appropriate code (e.g., a tag), encrypting it, removing or segregating it from the remaining non-confidential information (e.g., for separate transmission), etc. The confidential information identification operation would then include the first program logic 42A on the first computing device 2 identifying the confidential information from the flagging operation. The manual technique is particularly suitable for email messages, chat messages, documents, and other information content that is manually authored by the second user.

In another embodiment, confidential information may be automatically identified using a rule-based technique in which confidential information designation rules are created, stored and applied to information communicated between the first and second computing devices 2 and 6. This embodiment would be particularly suitable for information content that is automatically generated, such as web pages produced during online transaction processing. For example, a confidential information designation rule could be formulated that designates all numeric information having a certain format. Format examples could include all numerals following a dollar sign ($) (or other currency indicator), all numerals preceding a percent sign (%), sixteen-digit numeric sequences that are indicative of a credit card number, three-digit numeric sequences that are indicative of credit card security codes, four-digit numeric sequences that are indicative of debit card PIN numbers, nine-digit numeric sequences that are indicative of social security numbers, etc. Rules based on the location of information within a web page or other document could also be used, as could many other types of rule-based processing, including the processing employed in prior art confidential information masking techniques.

Rule-based confidential information identification could be performed by the second program logic instance 42B on the second computing device 6 before it sends information to the first computing device 2. The confidential information would then be flagged and sent to the first computing device 2 (together with the non-confidential information, if any), which would identify the confidential information from the non-confidential information based on the flagging operation, as in the manual embodiment. Alternatively, the ruled-based confidential information identification could be performed by the first program logic instance 42A on the first computing device 2 when it receives information content from the second computing device 6. It will be appreciated that the first and second program logic instances 42A and 42b could support both manual and automated identification of confidential information. In such an embodiment, a learning algorithm could be used to create confidential information identification rules from the manual designations.

A second operation, which would be performed strictly by the first program logic instance 42A on the first computing device 2, is to mask all identified confidential information on the display 2A while displaying any non-confidential information received from the second computing device 6. The confidential information masking operation entails displaying a mask in the display 2A in lieu of the confidential information at a location where the confidential information would normally appear. The mask can take many forms, including but not limited to a solid bar as is shown on the display 2A in FIG. 2. This mask, which is identified by reference numeral 44, represents only one possible type of mask. Other mask types would include replacement alphanumeric text (e.g., "xxxx" or "1111"), a text or graphic pattern, an icon, an image, etc. Note that the mask can be displayed in a manner that allows the confidential information displayed on the the third computing device 8 to be correlated with the mask as it is displayed on the first computing device 2. For example, the mask may be color coded with a color that matches a color associated with the confidential information shown in the display 8A. For example, FIG. 2 shows confidential information 46 displayed with a color bar (white) that matches the color of the mask 44 (also white). Note that the confidential information 46 could be displayed with appropriately colored text in lieu of the color bar shown in FIG. 2.

Color coding the mask and the confidential information has several advantages. For example, if the information sent from the second computing device 6 contains more than one item of confidential information, the use of a different color for each mask and corresponding confidential information item allows the context of that information to be determined. As previously noted, the mask is displayed in the display 2A at a location where the confidential information would normally be presented. Thus, the color coding allows the first user to match an item of confidential information shown on the display 8A with its correct location on the display 2A. The color coding could also be used to identify the source of the confidential information in case the first computing device 2 is being used to interact with more than one information sender. Alternatively, if the first user is running more than one application that implements the program logic instance 42A, the color coding could be used to help the first user associate the confidential information displayed on the third computing device 8 with a particular application running on the first computing device 2. In lieu of color coding, other techniques could also be used for identifying the source of the confidential information, such as by differentiated icons, images, patterns, alphanumeric identifiers, etc., as the masks, and by displaying all or part of the mask in association with the corresponding confidential information on the third computing device 8 (in addition to displaying it on the first computing device 2).

Another use of color coding would be to indicate a degree of confidentiality of the confidential information. In that case, the confidential information identification operation would include assigning the confidentiality level, and this level would map to an appropriate mask color. For example, high-level confidential information could be masked with a red color, medium-level confidential information could be masked with a blue color, etc. If there is multiple confidential information with the same degree of confidentiality (e.g., multiple instances of high-level confidential information), each instance could be masked using a different shade of the same color.

A third operation, which would also be performed by the first program logic instance 42A on the first computing device 2, is to forward the confidential information to the third computing device 8. The confidential information forwarding operation can be performed using any suitable communication technique. This operation includes forwarding the confidential information itself, and my further include sending mask correlation information so that the confidential information can be displayed on the third computing device 8 in a manner that correlates it with the mask displayed on the first computing device 8. For example, the mask correlation information could comprise color code information specifying the color of the mask. Alternatively, if the mask has other identifying characteristics (e.g., if it comprises an image, pattern, alphanumeric identifiers, etc.), one or more of those characteristics could be sent to the third computing device 8 to be displayed in association with the confidential information.

A wireless technology, such as Bluetooth pairing, may be used to establish the underlying communication link between the first and third computing devices 2 and 8. Other wireless technologies, such as WiFi and Cellular, could also be used, as could a wireline technology such as Ethernet, if so desired. In an example embodiment, the first program logic instance 42A may itself forward the confidential information to the third program logic instance 42C. Alternatively, the first program logic instance 42A could forward the confidential information via a proxy program, such as an email client, a text messaging application, a web server, etc.

A fourth operation, which is performed by the third program logic instance 42C, is to of display the confidential information to the first user on the third computing device 8, together with mask correlation information that associates the confidential information with a corresponding mask displayed by the first computing device 2. This functionality can be provided by any application running on the third computing device 8 that is capable of receiving the confidential information from the first device 2 and presenting it to the third user via the display 8A. The third program logic instance 42C may communicate directly with the first program logic instance 42A, or it may receive the confidential information from a proxy, such as an email client application, a text messaging application, or some other program acting on behalf of the first program logic instance 42A. As previously noted, the program logic instance 42C may be a dedicated program designed specifically to support confidential information delivery as disclosed herein, such as the confidential application 12. Alternatively, the program logic instance 42C could part of a larger program that provides other functionality, such as an email client, a text messaging program, a web browser, etc.

Figure 5:
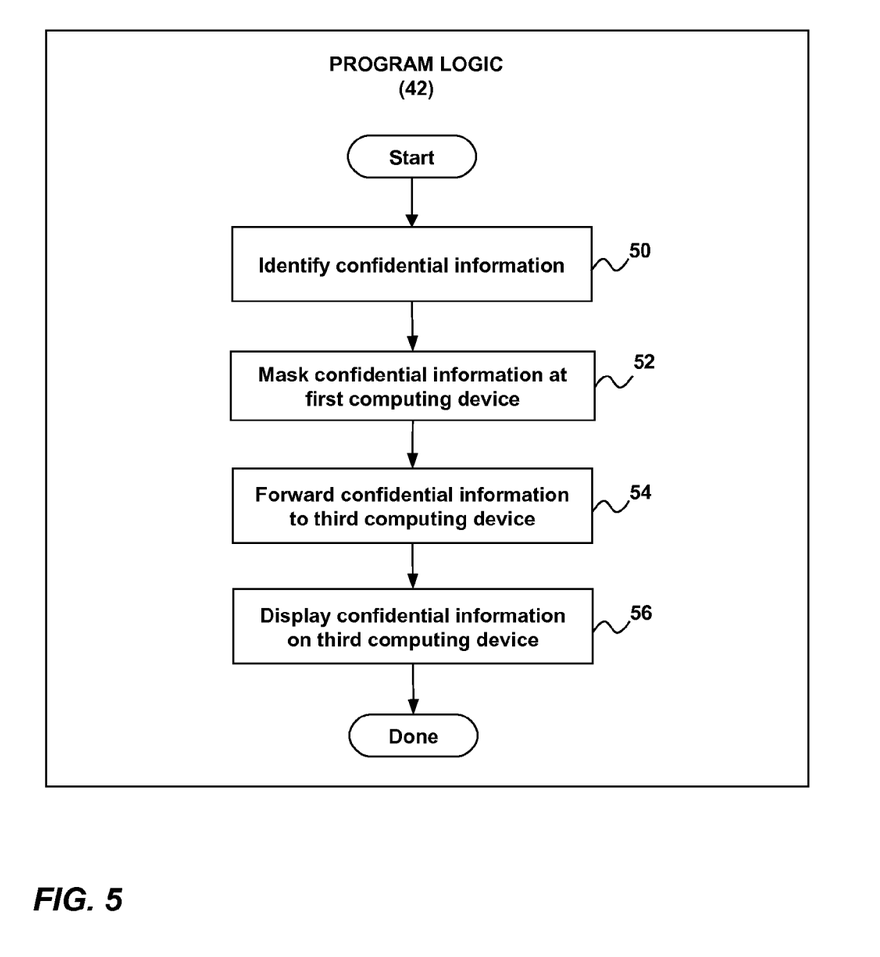
FIG. 5 a flow diagram showing example operations that may be performed by the program logic of FIG. 4.

FIG. 5 presents a flow diagram depicting the above-described operations of the first, second and third program logic instances 42A, 42B and 42C. Block 50 represents the confidential information identification operation. As noted above, this operation may be performed manually or with an automated technique using confidential information identification rules. The manual technique would typically be performed by the second user using the second program logic instance 42B on the second computing device 6. The automated technique could be performed by either the first program logic instance 42A on the first computing device 2 or the second program logic instance 42B on the second computing device 6. If either manual or automated confidential information identification operation is performed on the second computing device 6, the confidential information will be appropriately flagged and the confidential information identification operation will include the the first computing device 2 identifying the confidential information based on the flagging operation. In block 52, the first computing device 2 masks the identified confidential information on the display 2A, while displaying any non-confidential information that may have been received from the second computing device 6. Note that there may be cases were there is no non-confidential information, such as when the second computing device 6 sends only confidential information. In that case, the first computing device 2 might only display the mask that uses to hide the confidential information. In block 54, the first computing device 2 forwards the confidential information to the third computing device 8, and in block 56, the information is displayed on the display 8A in association with mask correlation information.

Each instance 42A, 42B and 42C of the program logic 42 may be implemented in software, firmware or a combination thereof, and with some (or all) operations potentially being performed by dedicated hardware logic. If implemented in software, the program logic 42 may be loaded from the persistent storage 28 (see FIG. 3) into a portion of the main memory 24 that comprises RAM (see FIG. 3). If implemented in firmware, the program logic 42 could reside in a portion of the main memory 24 that comprises ROM, such as EPROM memory. Each of the program logic instances 42A, 42B and 42C may comprise a collection of program instructions, possibly having entry and exit points, written in a suitable programming language. Such programming languages may include, but are not limited to, a high level procedural language such as C, a high level object oriented language such as C++, an interpreted language such as Java, BASIC, Perl, Python, or a lower level language such as assembly. The program instructions written in such languages may be compiled and/or interpreted and/or assembled (as the case may be) into machine language program instructions that are capable of execution on the CPU(s) 22. When the machine language program instructions are loaded into and executed by the CPU(s) 22, the resultant programmed computing device 2, 6 or 8 becomes a particular machine for practicing the subject matter described herein. Program instructions of a software implementation of the program logic 42 may be embodied in one or more modules, each of which may be compiled and linked into an executable program, installed in a dynamically linked library, or otherwise made ready for invocation and execution by the computing devices 2, 6 and 8. The module(s) may be implemented to run with or without the support of the underlying operating system 40. They may be callable from other modules or from themselves, and/or may be invoked in response to detected events or interrupts.

As previously mentioned, some aspects of the program logic 42 could be implemented using dedicated logic hardware. Examples of such hardware would include connected logic units such as gates and flip-flops, and/or integrated devices, such as application specific integrated circuits (ASICs), field programmable gate arrays (FPGAs)), reconfigurable data path arrays (rDPAs) or other computing devices. The design, construction and operation of such devices is well known in the art, and will not be described further herein in the interest of brevity.

Accordingly, a technique has been disclosed for delivering confidential information in a multi-device environment. It will be appreciated that the foregoing concepts may be variously embodied in any of a machine implemented method, a system, and a computer program product. Example embodiments of a machine-implemented method and a system have been described in connection with FIGS. 1-5. With respect to a computer program product, digitally encoded program instructions may be stored on one or more computer-readable, non-transitory data storage media for use in controlling a CPU or other instruction processing device to perform operations. The program instructions may be embodied as machine language code that is ready for loading and execution by the machine apparatus, or the program instructions may comprise a higher level language that can be compiled and/or interpreted and/or assembled into machine language. Example languages include, but are not limited to C, C++, Java, assembly, to name but a few. When implemented on a machine apparatus comprising a processor, the program instructions combine with the processor to provide a particular machine that operates analogously to specific logic circuits, which themselves could be used to implement the disclosed subject matter.

Figure 6:
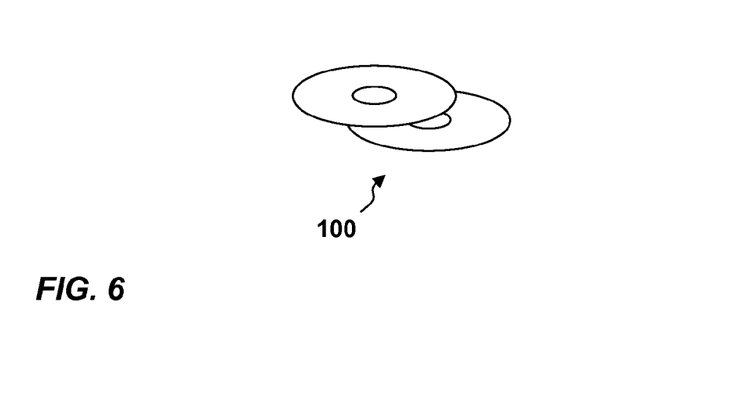
FIG. 6 is a diagrammatic perspective view showing example data storage media that may be used to store program instructions for implementing instances of the program logic of FIG. 4.

Example non-transitory data storage media for storing digitally encoded program instructions are shown by reference numerals 24 (memory) and 48 (persistent storage) of the computing devices 2, 6 and 8 shown in FIG. 3. A further example of non-transitory data storage media that may be used to store the program instructions is shown by reference numeral 100 in FIG. 6. The non-transitory data storage media 100 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such non-transitory data storage media can store the program instructions either alone or in conjunction with an operating system or other software product that incorporates the required functionality. The non-transitory data storage media could also be provided by portable electrical storage media (such as USB flash devices). The non-transitory data storage media may also be combined with drive systems (e.g. disk drives), or incorporated in a computing device (e.g., as random access memory (RAM), read-only memory (ROM) or other semiconductor or solid state memory). More broadly, the non-transitory data storage media could comprise any electronic, magnetic, optical, magneto-optical, infrared, semiconductor system or apparatus or device, or any other non-transitory entity representing a machine, manufacture or composition of matter that can contain, store, communicate, or transport the program instructions for use by or in connection with an instruction execution system, apparatus or device, such as a computer. For all of the above forms of non-transitory data storage media, when the program instructions are loaded into and executed by a computing device, the resultant programmed system becomes a particular machine for practicing embodiments of the method(s) and system(s) described herein.

Although various embodiments have been described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. A machine-implemented method for delivering confidential information in a multi-device environment, comprising:
 receiving non-confidential information and confidential information at a first computing device associated with a first user from a second computing device associated with a second user;
 masking said confidential information on said first computing device while displaying said non-confidential information received from said second computing device for viewing by said first user; and
 forwarding said confidential information for display on a third computing device associated with said first user for viewing by said first user while viewing said non-confidential information on said first computing device, said third computing device less likely to be viewable by users other than said first user who are near said first user than said first computing device, said third computing device more easily positioned or shielded by said first user than said first computing device is to prevent said users other than said first user from viewing said confidential information.

2. The method of claim 1, wherein said masking includes displaying a mask on said first computing device in lieu of said confidential information, said mask being displayed at a location where said confidential information would normally appear.

3. The method of claim 2, wherein said mask is displayed in a manner that allows said confidential information to be correlated with said mask.

4. The method of claim 3, wherein said mask is color coded with a color that matches a color associated with said display of said confidential information.

5. The method of claim 1, wherein said confidential information is received at said first computing device in combination with said non-confidential information, and wherein said method further includes a confidential information identification operation to distinguish said confidential information from said non-confidential information.

6. The method of claim 5, wherein said confidential information identification operation supports one or both of manual identification or automated identification of said confidential information.

7. The method of claim 5, wherein said confidential information identification operation is performed at one or both of said first computing device or said second computing device.

8. A system, comprising:
one or more CPUs;
a memory operably coupled to said one or more processors;
program logic stored in said memory for programming said one or more CPUs to perform operations for delivering confidential information in a multi-device environment, said operations comprising:
receiving non-confidential information and confidential information at a first computing device associated with a first user from a second computing device associated with a second user;
masking said confidential information on said first computing device while displaying said non-confidential information received from said second computing device; and
forwarding said confidential information for display on a third computing device associated with said first user for viewing by said first user while viewing said non-confidential information on said first computing device, said third computing device less likely to be viewable by users other than said first user who are near said first user than said first computing device, said third computing device more easily positioned or shielded by said first user than said first computing device is to prevent said users other than said first user from viewing said confidential information.

9. The system of claim 8, wherein said masking includes displaying a mask on said first computing device in lieu of said confidential information, said mask being displayed at a location where said confidential information would normally appear.

10. The system of claim 9, wherein said mask is displayed in a manner that allows said confidential information to be correlated with said mask.

11. The system of claim 10, wherein said mask is color coded with a color that matches a color associated with said display of said confidential information.

12. The system of claim 8, wherein said confidential information is received at said first computing device in combination with said non-confidential information, and wherein said operations further includes a confidential information identification operation to distinguish said confidential information from said non-confidential information.

13. The system of claim 12, wherein said confidential information identification operation supports one or both of manual identification or automated identification of said confidential information.

14. The system of claim 12, wherein said confidential information identification operation is performed at one or both of said first computing device or said second computing device.

15. A computer program product, comprising:
one or more non-transitory data storage media;
a computer program stored on said one or more data storage media, said computer program comprising instructions for programming a computing device to perform operations for delivering confidential information in a multi-device environment, said operations comprising:
receiving non-confidential information and confidential information at a first computing device associated with a first user from a second computing device associated with a second user;
masking said confidential information on said first computing device while displaying said non-confidential information received from said second computing device; and
forwarding said confidential information for display on a third computing device associated with said first user for viewing by said first user while viewing said non-confidential information on said first computing device, said third computing device less likely to be viewable by users other than said first user who are near said first user than said first computing device, said third computing device more easily positioned or shielded by said first user than said first computing device is to prevent said users other than said first user from viewing said confidential information.

16. The computer program product of claim 15, wherein said masking includes displaying a mask on said first computing device in lieu of said confidential information, said mask being displayed at a location where said confidential information would normally appear.

17. The computer program product of claim 16, wherein said mask is displayed in a manner that allows said confidential information to be correlated with said mask.

18. The computer program product of claim 15, wherein said confidential information is received at said first computing device in combination with said non-confidential information, and wherein said operations further includes a confidential information identification operation to distinguish said confidential information from said non-confidential information.

19. The computer program product of claim 18, wherein said confidential information identification operation supports one or both of manual identification or automated identification of said confidential information, and wherein said confidential information identification operation is performed at one or both of said first computing device or said second computing device.

20. The method of claim 1, wherein said first computing device is one of a laptop or desktop computer, and said second computing device is a smartphone.

* * * * *